United States Patent [19]

Shiga et al.

[11] Patent Number: 5,200,166

[45] Date of Patent: Apr. 6, 1993

[54] PURIFICATION OF HYDROGEN PEROXIDE SOLUTION

[75] Inventors: Shujiro Shiga, Oita; Yasuyoshi Sawaguri, Chiba; Koji Kabasawa, Chiba; Tatsuya Momobayashi, Chiba, all of Japan

[73] Assignee: Sumitomo Chemical Co., Ltd., Osaka, Japan

[21] Appl. No.: 815,182

[22] Filed: Dec. 31, 1991

[30] Foreign Application Priority Data

Jan. 14, 1991 [JP] Japan ................................. 3-2580

[51] Int. Cl.$^5$ ............................................ C01B 15/01
[52] U.S. Cl. .................................................. 423/584
[58] Field of Search ......................................... 423/584

[56] References Cited

U.S. PATENT DOCUMENTS 3,294,488 12/1966 Dunlop et al. .
3,297,404 1/1967 Elliott et al. .

FOREIGN PATENT DOCUMENTS 35-16677 2/1958 Japan .
1-153509 12/1987 Japan .

Primary Examiner—Wayne Langel
Attorney, Agent, or Firm—Sughrue, Mion, Zinn, Macpeak & Seas

[57] ABSTRACT

A process for purifying a hydrogen peroxide solution is disclosed, comprising treating a 10 to 60% by weight hydrogen peroxide solution having a pH between 1.5 and 5.0 and containing anionic impurities with a hydrogencarbonate type or carbonate type anion exchange resin while adding an acid or a salt thereof having an acid dissociation constant pKa in water of not more than 5 to the hydrogen peroxide solution to be treated continuously or semi-continuously in an amount of from 0.5 to 5 milli-equivalents per liter of hydrogen peroxide solution. The hydrogen peroxide decomposing activity of the anion exchange resin can be inhibited without decreasing a rate of removal of strong acid radicals in the anionic impurities thereby minimizing oxygen evolution due to decomposition of hydrogen peroxide.

5 Claims, No Drawings

PURIFICATION OF HYDROGEN PEROXIDE SOLUTION

FIELD OF THE INVENTION

This invention relates to a process for purifying a hydrogen peroxide solution. More particularly, it relates to a process for completely removing trace amounts of anionic impurities present in hydrogen peroxide solutions with high safety and at low cost. The process is advantageous for obtaining high purity hydrogen peroxide solutions for use in the electronics industry.

BACKGROUND OF THE INVENTION

The demand for hydrogen peroxide solutions having high purity sufficient for use in the electronics industry has been increasing with the advancement of DRAM (dynamic random-access memory) integration density. The latest demand is to reduce metallic impurity contents to several ppb (part per billion) and acid radical impurity contents to several tens ppb at the most. Hydrogen peroxide solutions themselves are relatively stable and, with high purity, need no stabilizer for prevention of decomposition. For the time being, however, since hydrogen peroxide solutions are produced by alkylanthraquinone autoxidation, they contain trace amounts of metallic impurities and are thereby somewhat unstable.

JP-A-1-153509 (the term "JP-A" as used herein means an "unexamined published Japanese patent application") discloses a process in which a crude hydrogen peroxide solution is treated with an anion exchange resin having adsorbed thereon a chelating agent. It is received that a chelating compound is coordinated on a dissolved metallic compound having a catalytic decomposition activity to stabilize the metallic compound thereby inhibiting the catalysis of the metallic compound. Such a stabilizing compound, when added to the crude solution, must be removed afterward by any known purification system to finally obtain a high purity hydrogen peroxide solution. While the above-described process is satisfactory as far as the removal of the four kinds of metallic ions mentioned is concerned, it encounters with difficulty in removal of acid radicals. The chelating agents disclosed in this patent, for example, ethylenediaminetetraacetic acid (EDTA), nitrilotriacetic acid (NTA), and diethylenetriaminepentaacetic acid (DTPA), have an acid dissociation constant pKa in the first stage of 2.0, 1.9, and 2.1, respectively (see The Chemical Society of Japan (ed.), *KAGAKU BINRAN KISO-HEN II*, 2nd Ed., p. 993, Maruzen, Tokyo (1975)).

On the other hand, the dissociation constant of phosphoric acid in the first stage is 2.15, very close to those of the above-described chelating agents. In other words, the chelating agents do not act as a weak acid with respect to phosphoric acid and therefore have difficulty in removing a phosphoric acid radical. Further, the patent states that the ratio of chelating agent to functional group of the anion exchange resin is not always 1:1 and may be less in some cases. In this case, however, the residual counter ion is a chloride ion, which is unsuitable for displacement of a dilute phosphoric acid radical.

JP-B-35-16677 (the term "JP-B" as used herein means an "examined published Japanese patent application") discloses that a hydrogencarbonate type anion exchange resin evolves only carbon dioxide. However, seeing that the composition analysis of the gas evolved revealed the presence of oxygen gas, this type of anion exchange resin appears to catalyze hydrogen peroxide decomposition. Moreover, considerable gas evolution also occurs with a carbonate type anion exchange resin. Thus, the process proposed is unsatisfactory in securing safety in purification of hydrogen peroxide solutions.

U.S. Pat. No. 3,297,404 and JP-B-35-16677 supra suggested the advantage of a hydrogencarbonate type strongly basic anion exchange resin in removal of metallic anions from hydrogen peroxide solutions but give no reference to the increase of decomposing activity with the amount of a hydrogen peroxide solution treated. Similarly, U.S. Pat. No. 3,294,488 describes usefulness of a hydrogencarbonate type strongly basic anion exchange resin in removal of a carboxylic acid radical, giving no reference to the increase of decomposing activity.

SUMMARY OF THE INVENTION

In the light of the above-mentioned problems associated with the conventional techniques, an object of the present invention is to provide a process for highly purifying a hydrogen peroxide solution comprising exhaustively removing trace amounts of anionic impurities by means of a hydrogen-carbonate type or carbonate type anion exchange resin, in which the hydrogen peroxide decomposing activity of the anion exchange resin proportionally increasing with the amount of a hydrogen peroxide solution to be treated is inhibited without decreasing a rate of removal of strong acid radicals in the anionic impurities thereby minimizing oxygen evolution due to decomposition of hydrogen peroxide.

The inventors have found that in the removal of trace amounts of anionic impurities from a hydrogen peroxide solution by use of a hydrogencarbonate type or carbonate type anion exchange resin, decomposition of hydrogen peroxide can be suppressed by carrying out the ion exchange treatment while adding an acid or a salt thereof to the hydrogen peroxide solution to be treated.

Thus, the present invention provides a process for purifying a hydrogen peroxide solution which comprises treating a 10 to 60% by weight hydrogen peroxide solution having a pH between 1.5 and 5.0 and containing anionic impurities with a hydrogencarbonate type or carbonate type anion exchange resin to remove the anionic impurities while adding an acid or a salt thereof having an acid dissociation constant pKa in water of not more than 5 to the hydrogen peroxide solution to be treated continuously or semi-continuously in an amount of from 0.5 to 5 milli-equivalents per liter of hydrogen peroxide solution (hereinafter referred to as meq/l).

In a preferred embodiment of the present invention, the hydrogen peroxide solution is continuously passed through the anion exchange resin to perform purification treatment in a continuous manner.

DETAILED DESCRIPTION OF THE INVENTION

The anion exchange resin which can be used in the present invention is of a hydrogencarbonate type or carbonate type for preference because of its ion exchanging performance and also because it leaves no trace on silicon wafers, etc. after washing with the thus purified hydrogen peroxide solution. The hydrogencarbonate type or carbonate type anion exchange resin is preferably a strongly basic anion exchange resin from the standpoint of ease of removal of the anion exchange resin and purification after that.

The acid or salt thereof which can be used in the present invention (hereinafter sometimes referred to as a decomposition inhibitor) has an acid dissociation constant pKa of not more than 5. It is preferably a chelating compound from the view-point of hydrogen peroxide stabilizing effect. Those acids which react with hydrogen peroxide or accelerate decomposition of hydrogen peroxide are excluded.

Specific examples of suitable decomposition inhibitors include inorganic acids, e.g., hydrochloric acid, chlorous acid, hydrofluoric acid, nitric acid, sulfuric acid, phosphinic acid, phosphonic acid, phosphoric acid, diphosphoric acid, tripolyphosphoric acid and, in addition, chelating agents, e.g., aminotris(methylenephosphonic acid), nitrilotri(methylenephosphonic acid), hydroxyethylidenediphosphonic acid, ethylenediaminetetra(methylenephosphonic acid), and diethylenetriaminepenta(methylenephosphonic acid); and organic acids, e.g., formic acid, acetic acid, chloroacetic acid, cyanoacetic acid, dichloroacetic acid, trichloroacetic acid, fluoroacetic acid, bromoacetic acid, iodoacetic acid, lactic acid, 2-chloropropionic acid, citric acid, tartaric acid, aminobenzoic acid, chlorobenzoic acid, dichlorobenzoic acid, nitrobenzoic acid, dinitrobenzoic acid, salicylic acid, p-hydroxybenzoic acid, o-fluorobenzoic acid, difluorobenzoic acid, o-bromobenzoic acid, o-iodobenzoic acid, phenoxyacetic acid, and benzenedicarboxylic acid and, in addition, various acetic acid derivatives as chelating agents, e.g., cyclohexanediaminetetraacetic acid, diethylenetriaminepentaacetic acid, ethylenediaminetetraacetic acid (EDTA), glycol ether diaminetetraacetic acid, hydroxyethylethylenediaminetriacetic acid, and nitrilotriacetic acid. Preferred of them are nitric acid, sulfuric acid, phosphoric acid, aminotris(methylenephosphonic acid), formic acid, acetic acid, trichloroacetic acid, p-hydroxybenzoic acid, and EDTA.

The decomposition inhibitor is added to a hydrogen peroxide solution in an amount of from 0.1 to 5 meq/l, and preferably from 0.2 to 4 meq/l. The terminology "milli-equivalent (meq)" as used herein means an exchange capacity of an ion exchange resin with an acid or a base. With the decomposition inhibitor added in lower concentrations, the rate of hydrogen peroxide decomposition tends to increase in continuous purification. In higher concentrations, on the other hand, the compound added, if having an ion exchangeability with an anion exchange resin, causes rapid reduction of the metallic ion-exchange capacity of the anion exchange resin. In choosing a strong acid, it is preferably used in an as small amount as possible, otherwise making it difficult for metallic anions to be re-exchanged due to its high ion-exchange potential.

The ion-exchange purification according to the present invention can be carried out either continuously or batchwise. The trace metallic impurities in hydrogen peroxide solutions include those existing as cations and those existing as anions mainly in the form of oxo complex ion. Since cation exchange resins scarcely exert activity of catalytically decomposing hydrogen peroxide, removal of metallic impurities and the above-described acid radical impurities can be achieved by passing a hydrogen peroxide solution through a cation exchange resin and an anion exchange resin in this order or vise versa.

Continuous purification by continuously passing a hydrogen peroxide solution through an ion exchange resin is advantageous from the standpoint of both economy and operation stability. The decomposition inhibitor is added either continuously or semi-continuously irrespective of the purification mode.

When the activity of an ion exchange resin is impaired by use of a strong acid, finally resulting in a loss of metal exchange capacity, the anion exchange resin may be disposed but is preferably regenerated for reuse. Regeneration is conducted in a usual manner, that is, the anion exchange resin is treated with a caustic alkali to exchange a hydroxyl radical with an acid radical and then treated in water with carbon dioxide to exchange the hydroxyl radical with a hydrogencarbonate radical until no carbon dioxide is absorbed any more.

The present invention is now illustrated in greater detail with reference to Examples, but it should be understood that the present invention is not deemed to be limited thereto.

The ion exchange resins, hydrogen peroxide solutions, analytic methods, etc. used in Examples were as follows.

Ion Exchange Resins:

The following hydrogencarbonate type anion exchange resins D, X, and Y and H type chelate resin P were used.

D: Duolite A-378, produced by Duolite International Inc. (a polymer comprising a polystyrene skeleton and a dimethylamino group as a main functional group)

X: Duolite A-109, produced by Duolite International Inc. (a three-dimensional polymer comprising a polystyrene skeleton and a quaternary ammonium group as an exchange group)

Y: Duolite A-132, produced by Duolite International Inc. (a three-dimensional polymer comprising a polyacrylate skeleton and a quaternary ammonium group as an exchange group)

P: Duolite C-467, produced by Duolite International Inc. (a three-dimensional polymer comprising a polystyrene skeleton and an aminomethylenephosphonic acid group as a chelate group)

|  | D | X | Y | P |
|---|---|---|---|---|
| Salt-splitting capacity (meq/ml-resin) | 0.1 | 1.3 | 1.1 | — |
| Weakly basic exchange capacity (meq/ml-resin) | 0.9 | 0.01 | 0.2 | — |
| Total exchange capacity (meq/ml-resin) | 1.0 | 1.3 | 1.3 | — |
| Exchange capacity (g-Cu/l-resin (H type) | — | — | — | 45 |

| Hydrogen Peroxide Solutions: | | |
|---|---|---|
|  | a | b |
| Hydrogen peroxide content (%) | 31.5 | 35.2 |
| Total phosphoric acid salt* (ppm) | 0.5 | 75 |
| Inorganic phosphoric acid** (ppm) | 0.3 | 19.2 |
| Free acid (ppm) | 6 | 40 |
| Evaporation residue (ppm) | <5 | 69 |
| TOC (ppm) | 7 | 77.5 |

-continued

| Hydrogen Peroxide Solutions: | | |
|---|---|---|
| | a | b |
| pH | 3.6 | 2.1 |
| Al (ppb) | 124 | 36 |
| Na (ppb) | <0.5 | 2800 |
| Fe (ppb) | 1.5 | 3 |
| Other metals (ppb) | <8.8 | <46 |

Note:
*Orthophosphoric acid + aminotris(methylenephosphonic acid), reduced to phosphoric acid (hereinafter the same).
**Orthophosphoric acid (hereinafter the same).

The hydrogen peroxide solution of grade a is hereinafter sometimes referred to as a high purity hydrogen peroxide solution. The hydrogen peroxide solution of grade b is hereinafter sometimes referred to as a low purity hydrogen peroxide solution.

Determination of Salt-Splitting Capacity:

The salt-splitting capacity, weakly basic exchange capacity, and the sum of them (i.e., total exchange capacity) of the above-described commercially available anion exchange resins were determined in a usual manner as follows (see *Manual of Ion Exchange Resin, DAIAION* (revised edition), pp. 95-99, published by Mitsubishi Kasei Corporation (1975)).

10 ml of an anion exchange resin, precisely measured with a 10 ml-measuring cylinder, was packed in a column by using pure water. 100 ml of 0.5N NaOH containing 5% NaCl was passed through the column at an SV (space velocity) of 10 for 1 hour. 50 ml of pure water was then passed at an SV of 10 for 0.5 hour. Finally, 200 ml of 2N NaOH was passed at an SV of 10 for 2 hours to convert the resin to a standard OH type. 200 ml of pure water was passed for washing therethrough at an SV of 10 for 1 hour until the effluent was not colored with a phenolphthalein indicator any more. Then, 200 ml of 5% NaCl was passed through the resin column at an SV of 10 for 2 hours, and the whole amount of the effluent was titrated with a 1N HCl solution using Bromothymol Blue as an indicator. The salt-splitting capacity (meq/ml) was calculated from equation [(ml of 1N HCl)×(HCl titer)]/(V ml). Subsequently, 50 ml of pure water was passed through the resin column at an SV of 10 for 0.5 hour, and 100 ml of 0.2N HCl was then passed at an SV of 10 for 1 hour. The resin layer was washed by passing 50 ml of methanol at an SV of 10 for 0.5 hour. Further, any liquid remaining in the resin layer was pressed out with air. The whole amount of these effluents (0.2N HCl effluent+methanol washing+liquid pressed out) was titrated with a 1N NaOH solution using Bromothymol Blue as an indicator. The weak base exchange capacity (meq/ml) was calculated from equation [20×(HCl titer)−(ml of 1N NaOH)×(NaOH titer)]/(V ml). In the above two equations, V ml is a "tamped volume" of the resin (Cl type) after pressing out with air, as read out with a 10 ml-measuring cylinder. The total exchange capacity (meq/ml) is obtained by adding together the salt-splitting capacity and the weak base exchange capacity.

Determination of Rate of Oxygen Evolution:

The gas evolved in an ion exchange resin column was separated by a gas-liquid separation tower, and the amount of the gas evolved was measured manually with a burette filled with a saturated sodium chloride aqueous solution or automatically with a thermal mass flowmeter. The $O_2$, $N_2$, and $CO_2$ composition was analyzed by gas chromatography and determined as converted to a standard state (0° C.) to obtain a rate of oxygen evolution (N-ml/s·l-resin).

EXAMPLE 1

In a 2 l glass beaker was put 2 l of high purity hydrogen peroxide solution a, and 0.25, 0.5, or 1.0 meq/l of p-hydroxybenzoic acid (pKa=4.6) was added thereto as a decomposition inhibitor. To each solution was added 5 ml of strongly basic anion exchange resin X and dipped therein at 25° C. for 20 hours with stirring. The amount of the hydrogen peroxide solution used above corresponded to the amount to be passed through a resin column in Examples 7 et seq., i.e., 400 l-$H_2O_2$ solution/l-resin.

Then, 5 ml of the strongly basic anion exchange resin X was collected by a 100 mesh polyethylene net and put in a Teflon-made cylindrical airtight container (inner diameter: 40 mm) together with 50 ml of fresh hydrogen peroxide solution a to which the decomposition inhibitor had been added. The rate of oxygen evolution at 30° C. was measured. The results obtained are shown below.

| Amount of p-hydroxybenzoic acid (meq/l-$H_2O_2$ solution) | 0.25 | 0.5 | 1.0 |
|---|---|---|---|
| pH after addition of p-hydroxybenzoic acid | 3.2 | 3.1 | 2.9 |
| Rate of oxygen evolution (N-ml/s · l-resin) | 0.46 | 0.13 | 0.003 |

It was thus proved that p-hydroxybenzoic acid has an excellent $H_2O_2$ stabilizing effect.

EXAMPLE 2

The same test as in Example 1 was conducted, except for using 1.0 meq/l of acetic acid (pKa=4.8) as a decomposition inhibitor. The results were as follows.

| Amount of acetic acid (meq/l-$H_2O_2$ solution) | 1.0 |
|---|---|
| pH after addition of acetic acid | 3.1 |
| Rate of oxygen evolution (N-ml/s · l-resin) | 0.58 |

EXAMPLE 3

The same test as in Example 1 was conducted except for using 1.0, 2.0, or 4.0 meq/l of EDTA·2Na (pKa=2.8) as a decomposition inhibitor. The results were as follows.

| Amount of EDTA · 2Na added (meq/l-$H_2O_2$ solution) | 1.0 | 2.0 | 4.0 |
|---|---|---|---|
| pH after addition of EDTA · 2Na | 3.2 | 3.3 | 3.4 |
| Rate of oxygen evolution (N-ml/s · l-resin) | 2.10 | 1.60 | 0.01 |

EXAMPLE 4

The same test as in Example 1 was conducted, except for using 3.0 meq/l of formic acid (pKa=3.8) as a decomposition inhibitor. The results were as follows.

| Amount of formic acid added (meq/l-$H_2O_2$ solution) | 3.0 |
|---|---|

| | |
|---|---|
| pH after addition of formic acid | 2.4 |
| Rate of oxygen evolution (N-ml/s · l-resin) | 0.26 |

The rate of oxygen evolution was 0.26 N-ml/s·l-resin. The difference from Example 2 in rate of oxygen evolution is attributed to the decomposition inhibitory activity of the organic acid. Formic acid was thus proved substantially equal to EDTA·2Na in decomposition inhibitory effect.

EXAMPLE 5

The same test as in Example 1 was conducted, except for using 1.0 meq/l of trichloroacetic acid (pKa=0.1) as a decomposition inhibitor. The results were as follows.

| | |
|---|---|
| Amount of trichloroacetic acid (meq/l-$H_2O_2$ solution) | 1.0 |
| pH after addition of trichloroacetic acid | 2.1 |
| Rate of oxygen evolution (N-ml/s · l-resin) | 0.29 |

EXAMPLE 6

The same test as in Example 1 was conducted, except for using an inorganic acid as a decomposition inhibitor, i.e., 1.0 meq/l of sulfuric acid (pKa=1.9), 1.0 meq/l of nitric acid (pKa=−1.8) or 2.0 meq/l of orthophosphoric acid (pKa=2.2). The results were as follows.

| Kind of inorganic acid added | sulfuric acid | nitric acid | ortho-phosphoric acid |
|---|---|---|---|
| Amount of inorganic acid added (meq/l-$H_2O_2$ solution) | 1.0 | 1.0 | 2.0 |
| pH after addition of inorganic acid | 2.2 | 2.0 | 2.2 |
| Rate of oxygen evolution (N-ml/s · l-resin) | 1.1 | 0.5 | 0.35 |

EXAMPLE 7

50 ml of strongly basic anion exchange resin X was packed in a Teflon-made cylinder (inner diameter: 40 mm), and low purity hydrogen peroxide solution b to which a phosphoric acid type decomposition inhibitor (pKa=ca. 1.5) had been added was passed through the resin column at 25° C. and an SV of 11.5. The results were as follows.

| Amount of $H_2O_2$ solution (l/l-resin) | 200 | 500 | 800 |
|---|---|---|---|
| Rate of oxygen evolution (N-ml/s · l-resin) | 0.4 | 0.3 | 0.1 |
| Hydrogen peroxide content (%) | 35.2 | 35.2 | 35.2 |
| Inorganic phosphoric acid** (ppm) | 0.1 | 0.1 | 0.7 |
| Free acid (ppm) | 2 | 2 | 3 |
| pH | 4.1 | 4.2 | 4.2 |
| Al (ppb) | 1 | 1 | 1.3 |
| Fe (ppb) | 0.4 | 0.4 | 0.4 |

The rate of oxygen evolution in the initial stage of treatment was about 0.2 N-ml/s·l-resin. It can be seen that the rate of oxygen evolution is lower than that in Comparative Example 1 hereinafter described and also decreases with the amount of the hydrogen peroxide solution treated. The break through point was about 900 l/l, which was the amount of the hydrogen peroxide solution having passed at the point where the basic sites approximately corresponding to the total exchange capacity were exchanged with total phosphate.

EXAMPLE 8

The same test as in Example 7 was conducted, except for passing high purity hydrogen peroxide solution a containing 3.2 meq/l of aminotris(methylenephosphonic acid) (pKa=ca. 1.5) through strongly basic anion exchange resin X. The results were as follows.

| Amount of $H_2O_2$ solution (l/l-resin) | 200 | 500 | 800 |
|---|---|---|---|
| Rate of oxygen evolution (N-ml/s · l-resin) | 0.6 | 0.5 | 0.01 |
| Hydrogen peroxide content (%) | 31.5 | 31.5 | 31.5 |
| Inorganic phosphoric acid** (ppm) | 0.2 | 0.4 | 20 |
| Free acid (ppm) | 4 | 5 | 15 |
| pH | 3.9 | 3.6 | 2.7 |
| Al (ppb) | 1 | 2 | 2 |
| Fe (ppb) | 0.4 | 0.5 | 0.5 |

The rate of oxygen evolution in the initial stage of treatment was about 0.2 N-ml/s·l-resin. The break through point was about 600 l/l, which was the amount of the hydrogen peroxide solution having passed at the point where the base sites approximately corresponding to the total exchange capacity were exchanged with total phosphate.

EXAMPLE 9

The same test as in Example 7 was conducted, except for passing high purity hydrogen peroxide solution a containing a mixture of 1.6 meq/l of aminotris(methylenephosphonic acid) (pKa ca. 1.5) and 0.3 meq/l of nitric acid (pKa=−1.8) through strongly basic anion exchange resin X. At the point where the rate of oxygen evolution was reduced to almost zero, the solution to be treated was changed to hydrogen peroxide solution a containing no decomposition inhibitor. The results were as follows.

| Amount of $H_2O_2$ solution (l/l-resin) | 200 | 500 | 800 | 1300 | 1700 | 2100 |
|---|---|---|---|---|---|---|
| Mixed decomposition inhibitor | added | added | added | added | none | none |
| Rate of oxygen evolution (N-ml/s · l-resin) | 0.5 | 0.5 | 0.2 | <0.01 | <0.01 | <0.01 |
| Hydrogen peroxide content (%) | 31.5 | 31.5 | 31.5 | 31.5 | 31.5 | 31.5 |
| Inorganic phosphoric acid** (ppm) | <0.1 | 0.1 | 0.2 | 11 | 1.0 | 0.2 |
| Nitric acid (ppm) | 0.1 | 0.3 | 0.4 | 15 | 10 | 9 |
| Free acid (ppm) | 3 | 5 | 6 | 46 | 16 | 10 |
| pH | 3.9 | 4.0 | 3.6 | 2.2 | 2.7 | 3.1 |
| Al (ppb) | 1 | 1 | 1 | 2 | 2 | 1 |

| | | | | | | |
|---|---|---|---|---|---|---|
| Fe (ppb) | 0.4 | 0.4 | 0.4 | 0.5 | 0.5 | 0.5 |

The rate of oxygen evolution in the initial stage of treatment was about 0.1 N-ml/s·l-resin. The break through point was about 900 l/l, which was the amount of the hydrogen peroxide solution having passed at the point where the base sites approximately corresponding to the total exchange capacity were exchanged with total phosphate. Further, at the point where the rate of oxygen evolution reached almost zero, i.e., after neutralization of the ion exchange resin completely ended, the amount of the hydrogen peroxide solution having passed through the column was 1400 l/l. From this point on, the supply of the mixed decomposition inhibitor was ceased, but the decomposing activity was no more restored.

EXAMPLE 10

The same test as in Example 7 was conducted, except for replacing the strongly basic anion exchange resin X with weakly basic anion exchange resin D and passing therethrough high purity hydrogen peroxide solution a containing 3.2 meq/l of aminotris(methylenephosphonic acid) (pKa=ca. 1.5). The results were as follows.

| | | | |
|---|---|---|---|
| Amount of $H_2O_2$ solution (l/l-resin) | 200 | 500 | 800 |
| Rate of oxygen evolution (N-ml/s · l-resin) | 0.05 | 0.01 | <0.01 |
| Hydrogen peroxide content (%) | 31.5 | 31.5 | 31.5 |
| Inorganic phosphoric acid** (ppm) | 0.5 | 14 | 17 |
| Free acid (ppm) | 2 | 4 | 20 |
| pH | 4.5 | 3.7 | 3.1 |
| Al (ppb) | 1 | 1 | 1 |
| Fe (ppb) | 0.1 | 0.3 | 0.3 |

With weakly basic anion exchange resin D, the rate of oxygen evolution in the initial stage of treatment was almost zero. The rate of oxygen evolution was extremely low, about 1/20 that of Example 8. The break through point was about 300 l/l, which was the amount of the hydrogen peroxide solution having passed at the point where the base sites approximately corresponding to the salt-splitting capacity were exchanged with total phosphate.

EXAMPLE 11

The same test as in Example 7 was conducted, except for passing low purity hydrogen peroxide solution b containing 1.6 meq/l of aminotris(methylenephosphonic acid) (pKa=ca. 1.5) through strongly basic anion exchange resin X. The results were as follows.

| | | | |
|---|---|---|---|
| Amount of $H_2O_2$ solution (l/l-resin) | 200 | 500 | 800 |
| Rate of oxygen evolution (N-ml/s · l-resin) | 0.2 | 0.25 | 0.1 |
| Hydrogen peroxide content (%) | 35.2 | 35.2 | 35.2 |
| Inorganic phosphoric acid** (ppm) | 0.2 | 1.5 | 5.0 |
| Free acid (ppm) | 2 | 2 | 7 |
| pH | 4.2 | 4.1 | 3.8 |
| Al (ppb) | 1 | 1 | 2 |
| Fe (ppb) | 0.1 | 0.2 | 0.2 |

The rate of oxygen evolution in the initial stage of treatment was about 0.05 N-ml/s·l-resin. The rate of oxygen evolution at the point when 200 l/l-resin of the hydrogen peroxide solution had passed was reduced to about a half of that of Example 7.

EXAMPLE 12

The same test as in Example 7 was conducted, except for passing high purity hydrogen peroxide solution a containing 1.0 meq/l of sulfuric acid (pKa=1.9) through strongly basic anion exchange resin X. In the course of treatment while an effective ion exchange resin still remained, the solution to be treated was changed to hydrogen peroxide solution a containing no decomposition inhibitor. The results were as follows.

| | | | | | |
|---|---|---|---|---|---|
| Amount of $H_2O_2$ solution (l/l-resin) | 200 | 500 | 800 | 1100 | 1200 |
| Decomposition inhibitor | added | added | added | added | none |
| Rate of oxygen evolution (N-ml/s · l-resin) | 0.3 | 0.3 | 0.2 | 0.05 | 0.15 |
| Hydrogen peroxide content (%) | 31.5 | 31.5 | 31.5 | 31.5 | 31.5 |
| Inorganic phosphoric acid** (ppm) | <0.1 | <0.1 | <0.1 | 0.3 | 0.2 |
| Sulfuric acid (ppm) | 0.1 | 0.1 | 0.2 | 4 | 0.5 |
| Free acid (ppm) | 3 | 4 | 7 | 11 | 11 |
| pH | 3.9 | 3.8 | 3.7 | 3.1 | 3.5 |
| Al (ppb) | 1 | 2 | 5 | 90 | 50 |
| Fe (ppb) | 0.4 | 0.4 | 0.5 | 1 | 1 |

The rate of oxygen evolution in the initial stage of treatment was about 0.2 N-ml/s·l-resin. The break through point was about 500 l/l. When the amount of the hydrogen peroxide solution having passed through the resin column reached 1100 l/l-resin, which corresponded to the point when about 1/5 of the ion exchange resin remained effectively, the supply of the decomposition inhibitor was ceased. As a result, the decomposition activity linearly increased in proportion to the amount of the solution treated or time.

EXAMPLE 13

The same test as in Example 7 was conducted, except for passing high purity hydrogen peroxide solution a containing 1.0 meq/l of nitric acid (pKa=−1.8) through strongly basic anion exchange resin X. At the point where the rate of oxygen evolution was reduced to almost zero, the solution to be treated was changed to hydrogen peroxide solution a containing no decomposition inhibitor. The results were as follows.

| | | | | | | |
|---|---|---|---|---|---|---|
| Amount of $H_2O_2$ solution (l/l-resin) | 200 | 500 | 800 | 1500 | 1800 | 2100 |
| Decomposition inhibitor | added | added | added | added | none | none |
| Rate of oxygen evolution (N-ml/s · l-resin) | 0.3 | 0.3 | 0.25 | <0.01 | <0.01 | <0.01 |
| Hydrogen peroxide | 31.5 | 31.5 | 31.5 | 31.5 | 31.5 | 31.5 |

-continued

| content (%) | | | | | | |
|---|---|---|---|---|---|---|
| Inorganic phosphoric acid** (ppm) | <0.1 | <0.1 | <0.1 | 0.2 | 0.2 | 0.1 |
| Nitric acid (ppm) | 0.3 | 0.4 | 1 | 35 | 10 | 9 |
| Free acid (ppm) | 4 | 5 | 6 | 40 | 15 | 10 |
| pH | 3.9 | 4.0 | 3.6 | 2.2 | 3.1 | 3.2 |
| Al (ppb) | 1 | 1 | 4 | 50 | 40 | 38 |
| Fe (ppb) | 1 | 0.4 | 0.5 | 0.5 | 2 | 1 |

The rate of oxygen evolution in the initial stage of treatment was about 0.1 N-ml/s·l-resin. The break through point was about 700 l/l-resin. When the rate of oxygen evolution reached almost zero, which corresponded to the point when neutralization of the ion exchange resin completely ended, the amount of the hydrogen peroxide solution having passed through the resin column was 1600 l/l-resin. At this point, the supply of the decomposition inhibitor was ceased, but the decomposing activity was no more restored.

EXAMPLE 14

The same test as in Example 7 was conducted, except for passing high purity hydrogen peroxide solution a containing 2.0 meq/l phosphoric acid (pKa=2.2) through strongly basic anion exchange resin X. The results were as follows.

| Amount of $H_2O_2$ solution (l/l-resin) | 200 | 500 | 800 |
|---|---|---|---|
| Rate of oxygen evolution (N-ml/s · l-resin) | 0.15 | 0.1 | 0.04 |
| Hydrogen peroxide content (%) | 31.5 | 31.5 | 31.5 |
| Inorganic phosphoric acid** (ppm) | 0.1 | 0.2 | 1 |
| Free acid (ppm) | 7 | 5 | 10 |
| pH | 3.7 | 3.7 | 3.2 |
| Al (ppb) | 0.5 | 1 | 10 |
| Fe (ppb) | 0.4 | 1 | 0.5 |

The rate of oxygen evolution in the initial stage of treatment was about 0.1 N-ml/s·l-resin. The break through point was about 600 l/l-resin.

EXAMPLE 15

The same test as in Example 7 was conducted, except for passing high purity hydrogen peroxide solution a containing 1.0 meq/l of EDTA·2Na (pKa=2.8) through strongly basic anion exchange resin X. The results were as follows.

| Amount of $H_2O_2$ solution (l/l-resin) | 200 | 350 | 500 | 800 | 1100 |
|---|---|---|---|---|---|
| Decomposition inhibitor | added | added | none | none | none |
| Rate of oxygen evolution (N-ml/s · l-resin) | 0.15 | 0.08 | 0.15 | 0.35 | 0.6 |
| Hydrogen peroxide content (%) | 31.5 | 31.5 | 31.5 | 31.5 | 31.5 |
| Inorganic phosphoric acid** (ppm) | 0.2 | 0.3 | 0.1 | <0.1 | <0.1 |
| Free acid (ppm) | 2 | 2 | 4 | 5 | 5 |
| pH | 5.3 | 5.3 | 3.9 | 3.9 | 3.9 |
| Al (ppb) | 1 | 1 | 1 | 1 | 1 |
| Fe (ppb) | 0.4 | 0.4 | 0.5 | 0.5 | 0.5 |

The rate of oxygen evolution in the initial stage of treatment was about 0.1 N-ml/s·l-resin. When the amount of the hydrogen peroxide solution having passed through the resin column reached 350 l/l-resin, which corresponded to the point when about 1/5 of the ion exchange resin remained effectively, the supply of the decomposition inhibitor was ceased. As a result, the decomposition activity linearly increased in proportion to the amount of the solution treated or time.

EXAMPLE 16

Two Teflon-made ion exchange resin columns (inner diameter: 40 mm) were connected in series, one of which was packed with chelate resin P, and the other with strongly basic anion exchange resin X. Chelate resin P had previously been confirmed to have high sequestering effect through batch testing. Low purity hydrogen peroxide solution b containing a phosphoric acid type decomposition inhibitor (pKa=ca. 1.5) was passed first through the chelate resin P column and then through the anion exchange resin X column. The results obtained are shown below.

| Amount of $H_2O_2$ solution (l/l-resin) | 200 | 500 | 800 |
|---|---|---|---|
| Rate of oxygen evolution (N-ml/s · l-resin) | 0.25 | 0.2 | 0.05 |

The rate of oxygen evolution in the initial stage of treatment was about 0.2 N-ml/s·l-resin. The difference from the results of Example 7 is assigned to reduction in catalysis of the metallic ions. That is, about 98% of the metallic ion impurities were removed by contact with the chelate resin so that the rate of oxygen evolution slightly decreased. The chelate resin induced substantially no catalytic decomposition of hydrogen peroxide, and it is seen that two resin columns can be used in combination. It is also seen that the catalysis of the metallic ions adsorbed onto the chelate resin is not a great factor.

COMPARATIVE EXAMPLE 1

High purity hydrogen peroxide solution a was passed through a Teflon-made column (inner diameter: 40 mm) packed with 50 ml of weakly basic anion exchange resin D at 25° C. and an SV of 11.5. The results obtained are shown below.

| Amount of $H_2O_2$ solution (l/l-resin) | 200 | 500 | 800 |
|---|---|---|---|
| Rate of oxygen evolution (N-ml/s · l-resin) | 0.4 | 0.9 | 1.6 |

It is obvious that the rate of decomposition of hydrogen peroxide increases in proportion to the amount of the hydrogen peroxide solution treated or time. When the weakly basic anion exchange resin was replaced with strongly basic anion exchange resin X, the rate of decomposition was about three times accelerated.

COMPARATIVE EXAMPLE 2

The same test as in Comparative Example 1 was carried out, except for passing high purity hydrogen peroxide solution a through strongly basic anion exchange resin Y having a polyacrylate skeleton. The results obtained are shown below.

| Amount of H$_2$O$_2$ solution (l/l-resin) | 200 | 500 | 800 |
|---|---|---|---|
| Rate of oxygen evolution (N-ml/s · l-resin) | 0.1 | 0.3 | 0.4 |
| Hydrogen peroxide content (%) | 31.5 | 31.5 | 31.5 |
| Inorganic phosphoric acid** (ppm) | 0 | 0 | 0 |
| Free acid (ppm) | 4 | 5 | 5 |
| pH | 4.4 | 4.5 | 4.5 |
| Al (ppb) | 1 | 5 | 8 |
| Fe (ppb) | 0.4 | 0.5 | 0.9 |

The rate of oxygen evolution in the initial stage of treatment was about 0.01 N-ml/s·l-resin. While the rate of oxygen evolution was about ¼ that of Comparative Example 1, it similarly increased with the amount of the hydrogen peroxide solution treated.

COMPARATIVE EXAMPLE 3

The same test as in Example 7 was conducted, except for passing high purity hydrogen peroxide solution a containing 0.01 meq/l of aminotris(methylenephosphonic acid) (pKa=ca. 1.5) through anion exchange resin D. The results were as follows.

| Amount of H$_2$O$_2$ solution (l/l-resin) | 200 | 500 | 800 |
|---|---|---|---|
| Rate of oxygen evolution (N-ml/s · l-resin) | 0.35 | 0.90 | 1.55 |
| Hydrogen peroxide content (%) | 31.5 | 31.5 | 31.5 |
| Inorganic phosphoric acid** (ppm) | <0.1 | <0.1 | <0.1 |
| Free acid (ppm) | 4 | 4 | 4 |
| pH | 3.8 | 3.7 | 3.6 |
| Al (ppb) | 1 | 1 | 1 |
| Fe (ppb) | 0.2 | 0.2 | 0.3 |

The rate of oxygen evolution increased with the treated amount similarly to Comparative Example 1. This result indicates that addition of such a trace amount of aminotris(methylenephosphonic acid) fails to produce decomposition inhibitory effects.

In ion-exchange purification of a crude hydrogen peroxide solution by means of a hydrogencarbonate type or carbonate type anion exchange resin for exhaustive removal of trace amounts of anions essentially contained therein, the present invention makes it possible not only to reduce hydrogen peroxide decomposing activity of the anion exchange resin but also to prevent such an activity from increasing with the amount of the hydrogen peroxide solution to be treated without causing a reduction in rate of removal of strong acid radicals. Thus, hydrogen peroxide solutions of high quality that has never been reached can be produced with good economy and high safety.

While the invention has been described in detail and with reference to specific examples thereof, it will be apparent to one skilled in the art that various changes and modifications can be made therein without departing from the spirit and scope thereof.

What is claimed is:

1. A process for purifying a hydrogen peroxide solution which comprises treating a 10 to 60% by weight hydrogen peroxide solution having a pH between 1.5 and 5.0 and containing anionic impurities with a hydrogencarbonate form or carbonate form anion exchange resin to remove the anionic impurities while adding an acid or a salt thereof having an acid dissociation constant pKa in water of not more than 5 to the hydrogen peroxide solution to be treated continuously or semi-continuously in an amount of from 0.1 to 5.0 milliequivalents per liter of hydrogen peroxide solution; wherein said acid or salt thereof is at least one compound selected from the group consisting of hydrochloric acid, chlorous acid, hydrofluoric acid, nitric acid, sulfuric acid, phosphinic acid, phosphonic acid, phosphoric acid, diphosphoric acid, tripolyphosphoric acid, formic acid, acetic acid, chloroacetic acid, cyanoacetic acid, dichloroacetic acid, trichloroacetic acid, fluoroacetic acid, bromoacetic acid, iodoacetic acid, lactic acid, 2-chloropropionic acid, citric acid, tartaric acid, aminobenzoic acid, clorobenzoic acid, dichlorobenzoic acid, nitrobenzoic acid, dinitrobenzoic acid, salicylic acid, p-hydroxybenzoic acid, o-fluorobenzoic acid, difluorobenzoic acid, o-bromobenzoic acid, o-iodobenzoic acid, phenoxyacetic acid, benzenedicarboxylic acid, aminotris(methylenephosphonic acid), nitrilotri(-methylenephosphonic acid), hydroxyethylidenediphosphonic acid, ethylenediaminetetra(methylenephosphonic acid), diethylenetriaminepenta(methylenephosphonic acid), cyclohexanediaminetetraacetic acid, diethylenetriaminepentaacetic acid, ethylenediaminetetraacetic acid, glycol ether diaminetetraacetic acid, hydroxyethylethylenediaminetriacetic acid, and nitrilotriacetic acid, and salts thereof.

2. A process as claimed in claim 1, wherein the hydrogen peroxide solution is continuously passed through the anion exchange resin to perform purification treatment in a continuous manner.

3. A process as claimed in claim 1, wherein said acid or salt thereof is at least one compound selected from the group consisting of nitric acid, sulfuric acid, phosphoric acid, formic acid, acetic acid, trichloroacetic acid, p-hydroxybenzoic acid, aminotria(methylenephosphonic acid), and ethylenediaminetetraacetic acid.

4. A process as claimed in claim 1, wherein said acid or salt thereof is added in an amount of from 0.2 to 4 milliequivalents per liter of hydrogen peroxide solution.

5. A process as claimed in claim 1, wherein said hydrogencarbonate form or carbonate form anion exchange resin is a strongly basic anion exchange resin.

* * * * *